United States Patent Office 2,770,466
Patented Nov. 13, 1956

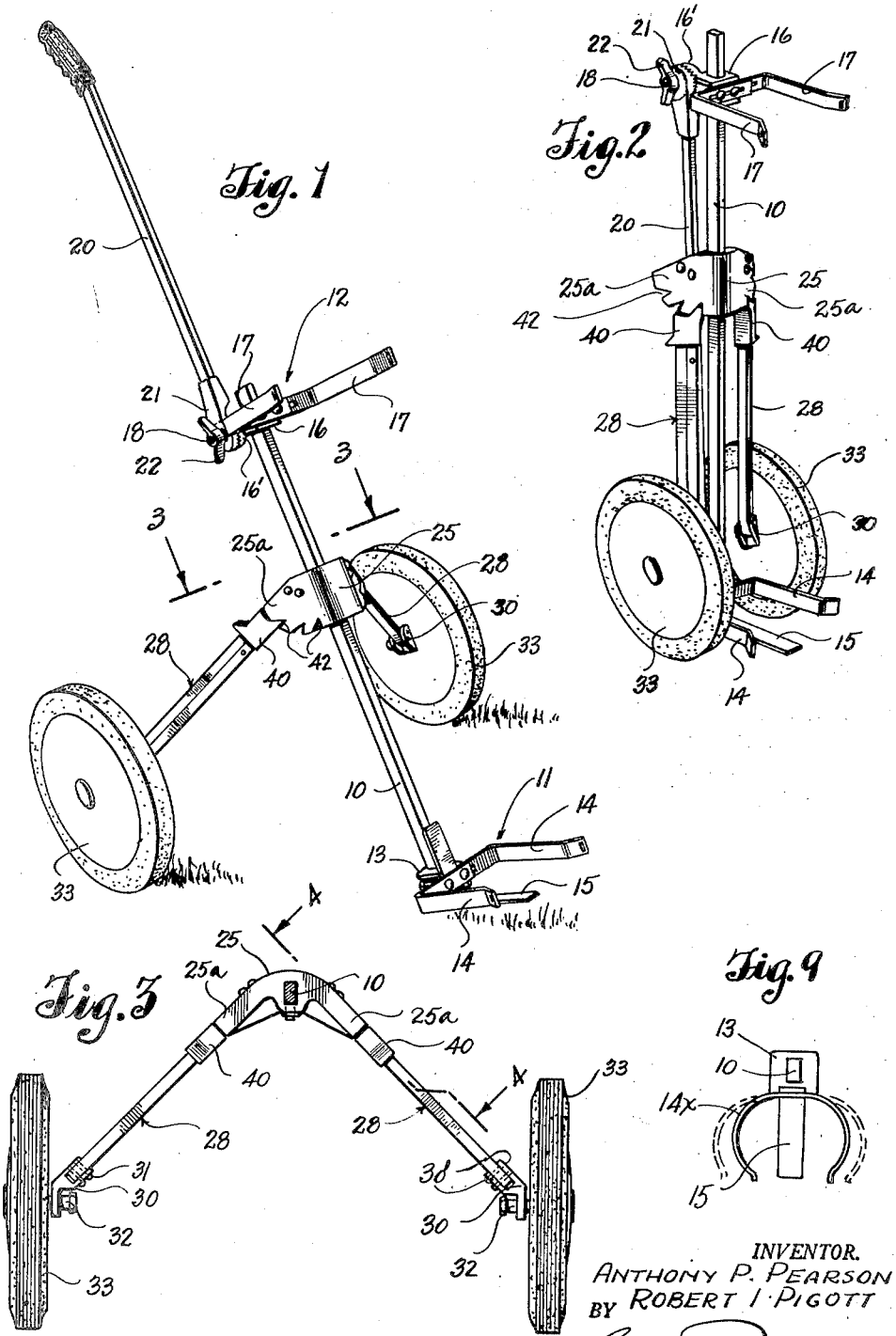

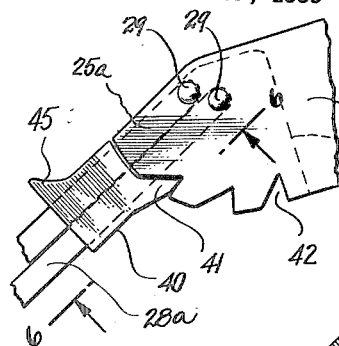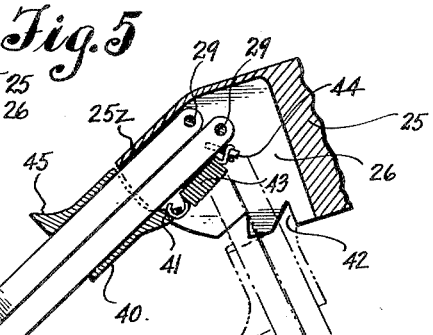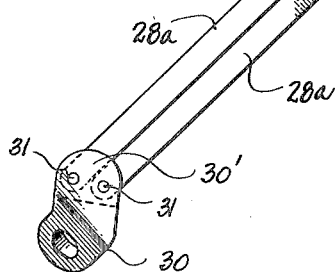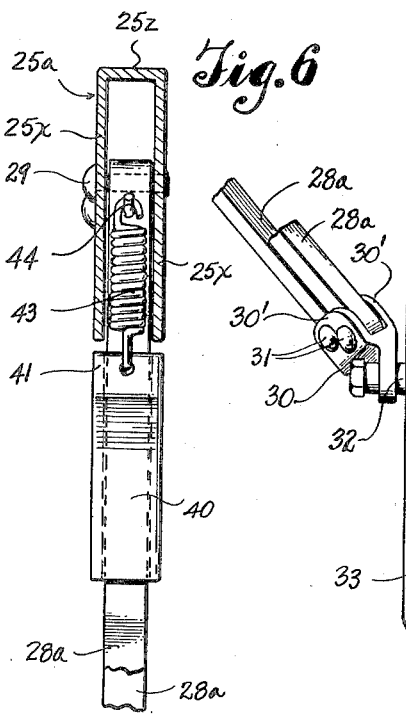

2,770,466

GOLF CART WITH COLLAPSIBLE WHEEL STRUCTURE

Anthony P. Pearson and Robert I. Pigott, Seattle, Wash.

Application March 28, 1955, Serial No. 497,072

9 Claims. (Cl. 280—41)

This invention relates to what are generally known as golf carts. More particularly, it has reference to improvements in golf carts of that type illustrated and described in U. S. Patent No. 2,679,402 wherein a pair of wheels is supported from a centrally located bag holding frame by hinged legs that provide for adjusting the wheels from a substantially spaced relationship for normal use of the cart on a golf course to a closely spaced relationship for storage of the cart as, for example, in a locker, or for easier transportation of the cart in an automobile.

It is the principal object of this invention to provide a cart of the above disclosed character having improved wheel mounting and securing means whereby the paired wheels may be adjusted to different spacings, and which provides that they will be retained in parallel relationship, and also parallel with the vertical plane of the bag frame when set at the different distances of spacing.

It is also an object of the invention to provide novel means of support for the pivotally hinged legs that carry the wheels, and a novel and more practical means for locking the wheel carrying legs to retain the wheels at any one of the plurality of definite spacings provided for.

Another object of the invention is to provide a leg latching or holding means which operates to automatically and positively compensate for wear on interfitting parts thus to eliminate looseness or rattling.

Yet another object of the invention is to provide foot releasable latch devices for the wheel carrying legs so that the legs may swing under influence of gravity from extended position to collapsed position.

Still further objects of the invention reside in the various details of construction of parts embodied in the cart and in their mode of use, as will herein be fully described.

In accomplishing these and other objects of the invention, we have provided the improved details of construction, the preferred forms of which are illustrated in the accompanying drawings, wherein:

Fig. 1 is a perspective view of a golf cart embodying the improvements of the present invention therein, and showing the supporting wheels as adjusted to and locked at maximum spacing.

Fig. 2 is a perspective view showing the wheel carrying legs, wheels and handle as collapsed to positions closely adjacent the main frame member, as for storage of the cart.

Fig. 3 is a section through the cart as seen on line 3—3 in Fig. 1.

Fig. 4 is a somewhat enlarged sectional detail, taken on line 4—4 in Fig. 3, showing details and relationship of parts of a wheel supporting leg.

Fig. 5 is a side view of a wheel leg latching dog as engaged with the leg mounting member.

Fig. 6 is an enlarged sectional detail taken on line 6—6 in Fig. 5, showing a latch dog and its holding spring.

Fig. 7 is an elevation of one of the wheels and its mounting knuckle as attached to the lower end of a wheel carrying leg.

Fig. 8 is a perspective view of one of the leg latching dogs.

Fig. 9 is a detail showing an alternative form of bag holding means.

Referring more in detail to the drawings:

The present cart is shown in Fig. 1 as erected for golf course use. It comprises, as the main frame structure thereof, an elongated, rigid bar 10 which is equipped at its lower end with means, designated in its entirety by numeral 11, for the support and holding of the lower end of a golf bag. Likewise, at its upper end, it is equipped with a cradle, designated in its entirety by numeral 12 for holding the upper end of the bag. The bag holding means 11 as applied to the lower end of bar 10, comprises a block 13 that is rigidly fixed to the bar. Fixed to the forward side of this block are paired, laterally spaced and forwardly extended arms, 14—14; these are adjustably secured to the block to permit them to be spaced as required for the accommodation of bags of different sizes. Associated therewith is a centrally located, forwardly extended arm 15 on which the bag, as held between the arms 14—14 may be rested for support. The cradle 12, at the upper end of bar 10, comprises a block 16 that is mounted on the upper end portion of bar 10 for adjustment to different positions therealong to accommodate it to the length of the bag. To the forward side of this block, a pair of laterally spaced, forwardly extending arms 17—17 are adjustably secured to receive and retain the upper end of a supported bag between them.

Pivotally attached to a rearwardly extending part 16' of block 16, by means of a horizontally and transversely directed pivot bolt 18 passed therethrough, is a handle lever 20. This is adapted to be swingingly adjusted from a position extending downwardly along the back side of rod 10 as seen in Fig. 2, to an upwardly extended position as shown in Fig. 1, and to be held there or at any of its various intermediate positions of adjustment, by tightening the mounting head portion 21 of the lever against the block head 16'; this being accomplished by tightening a wing nut 22 that is threaded onto the bolt 18 as shown in Figs. 1 and 2.

The present invention is characterized by the novel features of the wheel mounting means which will now be described. It is shown in Figs. 1, 2 and 3 that a leg mounting block or casting 25, which for convenience in description will be referred to as a "cross-head" is adjustably fixed to rod 10, at a location about one-third of the length of the rod measured downward from its upper end. This cross-head 25 is formed at opposite sides, as noted in Fig. 3, with laterally and rearwardly directed wings 25a—25a extending at right angles to each other. Each wing is made hollow to provide it with a downwardly opening socket 26. This is defined between parallel opposite side walls 25x—25x and a top closing wall 25z as best shown and identified in Fig. 4.

Extended into the sockets 26 of the laterally and rearwardly directed wings 25a are the upper end portions of wheel mounting legs, designated in Fig. 1 by reference numerals 28; each of these legs comprising a pair of parallel rods 28a—28a of equal length. These legs have their upper end portions pivotally fixed in the wing sockets 26 of the cross-head by pivot pins 29 extended therethrough and through the opposite side walls of the wing; the pins being riveted against displacement. At their lower ends, the paired rods of each leg, are fixed between the spaced ears 30' of a knuckle 30 by pivot pins 31 directed through the ears and riveted against displacement. Each knuckle mounts an axle 32 on which a ground wheel 33 is revoluble. The two wheels are held by their supporting means in parallel planes, and in axial alignment when at corresponding positions of adjustment, as herein provided for.

The arrangement of the pairs of wheel carrying legs 28—29 and the manner of their attachment to the wings of the cross-head 25 and to the knuckles 30 is that of a parallelogram whereby, in their inward or outward swinging, the wheels always are retained in alignment for straight ahead rolling support of the cart.

When the legs 28 are in extended position, as in Fig. 1, the two wheels and the lower end of bar 10 will provide a three point support for the cart to hold the golf bag that may be contained therein in an upright position for easy and ready placing of clubs in or their removal from the bag.

To retain the legs extended, or fully retracted, or at the intermediate position of adjustment provided for, we have equipped each leg with a latch dog. Each dog is in the nature of a rectangular boot or sleeve 40, through which the paired leg forming members 28a—28a extend, and which is mounted for limited sliding adjustment along the leg. At its upper end, each boot is formed with an extending, wedge shaped tooth 41 designed to be received in any one of a plurality of correspondingly shaped notches 42 formed in the arcuate lower edge surface of the wing of the cross-head in which the leg is pivoted. A coiled spring 43 is attached under tension, as shown in Fig. 6, to the upper end of the tooth 41 and to a stud 44 extending from the pivoted end of the leg to pull the sleeve upwardly and urge the tooth toward a firmly seated position in the retaining notch as illustrated in Fig. 5.

Important features of the wedge like tooth 41 reside in the angle of its converging surfaces. The surface designated in Fig. 8 by reference character 41a is formed at an angle of about 5° to the adjacent face of the leg along which the boot slides. As this tooth moves into that notch 42 of the wing that holds the leg in its fully extended position, its surface 41a engages the corresponding opposedly related surfaces of the notch, and under the influence of the inward pull of coiled spring 43, slides inwardly therealong, causing the leg to be crowded outwardly and brought firmly against the socket closing top wall 25z of the wing which limits the outward swing of the leg. It is to be observed, especially by reference to Fig. 5, that when the leg is thus crowded to its limit of outward movement, there is still slight clearance between the inside beveled surface 41b of the tooth 41 and the corresponding faces of the tooth containing notch, and also between the upper end of the boot and wing edge. Thus there is an automatic take up incident to any resultant wear on the parts. It is further to be explained that the leg parts 28a—28a are so mounted that at no time do they come into tight face to face contact. At the lower end of each sleeve 40, and extending rearward is a lug or projection 45 against which downward pressure can be applied, as by the foot of the cart user, to disengage the latching dog from the wing for the downward swinging adjustment of the leg toward or to its collapsed condition of Fig. 2.

It is a further important feature of this construction that the legs may be adjusted from collapsed condition outwardly merely by grasping them and pulling them upwardly, and in doing this it is not required that any latches or catches be released first. This is by reason of the angle of slope of the surface 41b of the tooth 41.

In the present instance, each of the wings 25a has been shown as having three notches 42. This provides for locking the legs in fully extended position as in Fig. 1, in fully collapsed position, as in Fig. 2, or at an intermediate position. This intermediate position of adjustment as provided for by the middle notch 42 adapts the bag for use with the larger types of bags which would be crowded between the wheels if adjusted to their fully collapsed relationship.

The wheels are illustrated as being equipped with rubber tires and it is also anticipated that they be mounted to revolve on anti-friction bearings.

In Fig. 9, we show an alternative form of bag holding means which might be used in lieu of parts 11 and 12. This comprises an easily bendable strip of metal 14x fixed to the block 13 and having opposite end portions that can be bent to suit the size of bag to be retained. This eliminates the requirement for the two laterally adjustable parts 14—14 or 17—17.

Having thus described our invention, what we claim as new therein and desire to secure by Letters Patent is:

1. A cart of the character described comprising a frame structure including an elongated, central bar, a cross-head fixed to the bar between its ends, a pair of legs with their inner ends pivoted on the opposite end portions of the cross-head, respectively, for swinging adjustment from positions extended closely along opposite sides of said central bar to a plurality of definite positions outwardly directed therefrom, a wheel mounted at the outer end of each of said legs, for the wheeled support of the cart at any of the various positions of adjustment of said legs; said cross-head being provided at its opposite ends with edge surfaces along which portions of the legs that are adjacent their pivotal mountings, are adapted to swing in moving from one position of adjustment to another, said edge surfaces being provided with notches, at spaced intervals therealong, a boot slidably fitted to each leg, a tooth projecting from the inner end of each boot adapted to be received in any one of said notches of the corresponding edge surface to retain the leg to which the boot is fitted at a definite position of adjustment.

2. A cart as recited in claim 1 wherein spring means acts against said boots to urge them to, and to yieldingly hold them in leg locking positions.

3. A cart as recited in claim 1 wherein spring means acts against said boots to urge them to and yieldably hold them in leg locking positions, and a toe projecting from each boot against which downward pressure may be manually applied to shift the boot to disengage its tooth from holding contact with the corresponding notched edge of the cross-head.

4. A combination of parts as recited in claim 1 wherein said notches in said edge surfaces are formed with converging surfaces, and the tooth on each boot conforms to the shape of the notches within which it is to be received; each notch having one of its defining surfaces at such an angle relative to the direction of adjustment of the boot on the leg that an outward and upward pull applied to the leg will effect an automatic unseating of the boot tooth from the notch.

5. A combination of parts as recited in claim 1 wherein said notches as applied to said cross-head are formed with converging defining surfaces, and the tooth on each boot conforms to the shape of the notches within which it is to be received; each notch having one of its surfaces at such an angle relative to direction of movement of the boot on the leg that an outward and upward pull applied to the leg will effect an automatic unseating of the boot tooth from the notch, and the other defining surface of the notch is only slightly inclined relative to the direction of movement of the boot on the leg, to prevent any automatic unseating of the tooth under weight applied to the cart.

6. A cart as recited in claim 2 wherein stop means are provided at opposite ends of the cross-head for limiting the outward swing of the legs as mounted thereon and wherein the entry of the locking tooth of each boot into the outer notch at that end of the cross-head effects the automatic outward wedging of the leg against the corresponding stop.

7. A cart as in claim 2 wherein the opposite end portions of said cross-head are formed with pockets designed to contain the end portions of said legs therein for their pivotal swinging, and wherein the notched edge surfaces along which the legs swing are arcuately curved about the pivot points of the legs, and said spring means comprises coiled springs that are attached, under tension, at opposite ends to the upper end of the boot tooth and upper end of the leg to which the boot is applied.

8. A golf cart of the character described comprising a frame structure having a central, elongated bar equipped for support of a golf bag thereon, and having a handle adjustably fixed thereto at its upper end, for propulsion of the cart, a cross-head fixed to the bar intermediate its ends and having opposite end portions thereof rearwardly inclined, and each formed with a downwardly opening pocket, a pair of legs with inner end portions extended into said pockets, means pivotally affixing the inner ends of the legs in the pockets for swinging adjustment of the legs from positions extending along the central bar to different outwardly extended position, a wheel mounted at the outer end of each of said legs, for wheeled support of the cart, said cross-head having notches formed in the edge surfaces of the pockets along which the legs swing, a boot slidably fitted to each leg, each with a tooth to engage with notches of the corresponding edge surface to hold the leg at a definite position of adjustment, a spring attached to each boot and to the leg to yieldingly retain the boot to locking position, each boot having a toe projecting therefrom whereby it can be manually moved to a tooth releasing position.

9. A cart as in claim 8 wherein the wheels each are mounted on their respective legs by a knuckle, and each of said legs comprises two parallel links with inner ends pivotally joined with the end of the cross-head and their outer ends pivotally joined with the corresponding wheel knuckle whereby the wheels retain a parallel relationship to the vertical plane of the central bar for all positions of adjustment of the legs.

References Cited in the file of this patent

UNITED STATES PATENTS

| | | |
|---|---|---|
| 2,713,494 | Bailey | July 19, 1955 |

FOREIGN PATENTS

| | | |
|---|---|---|
| 662,882 | Great Britain | Dec. 12, 1951 |
| 20,586 | Sweden | Aug. 2, 1904 |